R. DICK.
Addressing Machine.
No. 9,282. Reissued July 6, 1880.
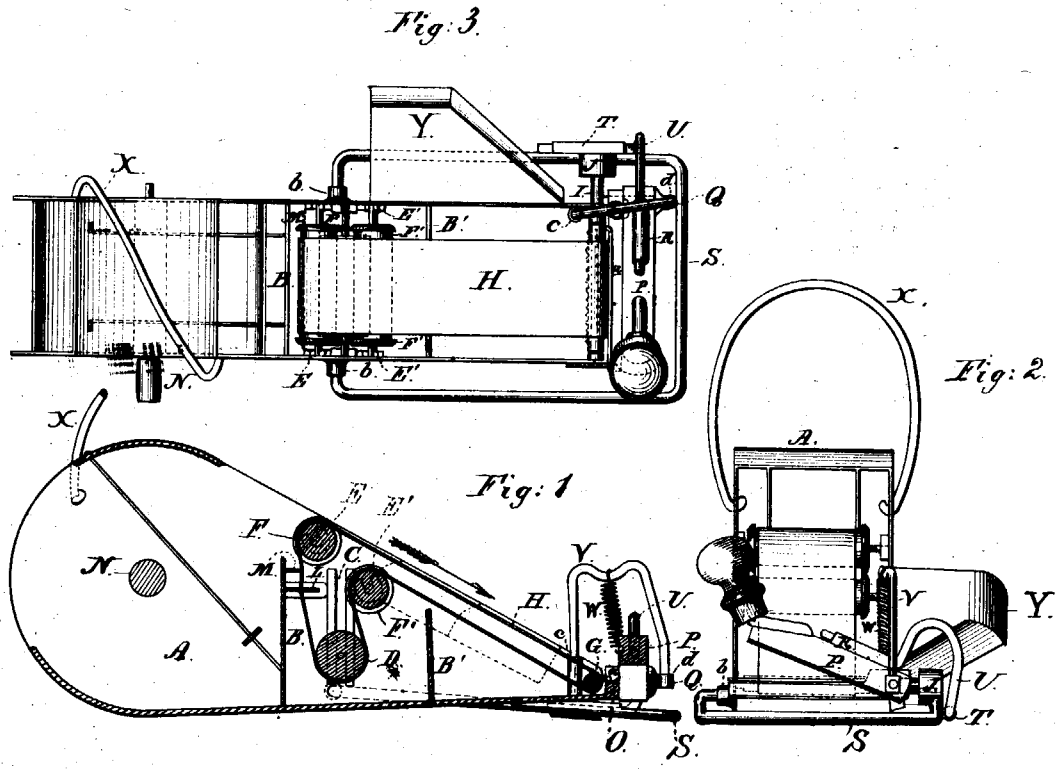
WITNESSES
John F. E. Weinlert
F. W. Smith Jr.
Robert Dick. INVENTOR
By. Wm. Crowe Entire ATTORNEY

UNITED STATES PATENT OFFICE.

ROBERT DICK, OF BUFFALO, NEW YORK.

ADDRESSING-MACHINE.

SPECIFICATION forming part of Reissued Letters Patent No. 9,282, dated July 6, 1880.

Original No. 64,502, dated May 7, 1867; Reissue No. 6,832, dated January 4, 1876. Application for reissue filed May 15, 1880.

*To all whom it may concern:*

Be it known that I, ROBERT DICK, of the city of Buffalo, in the county of Erie and State of New York, have invented a new and useful Improvement on my Mailing-Machine patented by me October 4, 1859, which improvement is fully set forth in the following specification.

In operating the machine made the subject of the Letters Patent referred to there are many difficulties, among which may be mentioned the following: First, paste of a sufficiently substantial character could not be used, owing to the absence of distributers; second, the belt did not run smoothly, but persisted in slipping sidewise; and, third, too much labor was imposed upon the right hand, owing to the fact that the vibrating knife and label-stamp had to be moved by the hand, and the papers, when duly addressed, had to be removed by the same member.

The object of my present invention is to remedy the evils named; and with these ends in view my invention consists, first, in combining with the vibrating cutter's blade and stamp and the shell means, as hereinafter described, whereby the downward movement of the shell bodily will cause the knife and stamp to vibrate and cut off and affix the label without in any manner calling into use the right hand.

My invention consists, secondly, in combining with the shell and movable label-pasting belt paste distributers and cleaners, as will be hereinafter set forth.

My invention consists, thirdly, in the combination and arrangement, with the shell and belt, of a series of feed-rollers, as will be hereinafter more fully set forth; and my invention consists, fourthly, of a feed-roller composed of a tube having its exterior surface roughened, and secured in position by the shaft of the thumb-feed, as will be hereinafter more fully set forth.

In order that those skilled may fully understand my invention, I will proceed to describe the construction and operation of the same, referring by letters to the accompanying drawings, in which—

Figure 1 is a central longitudinal section of an addressing-machine embodying my invention. Fig. 2 is a front view, and Fig. 3 a top view.

Similar letters indicate like parts in the several figures.

A is the shell, which is of substantially the character and form shown in my patent of 1859.

B B′ are two vertical partitions, which, with the sides of the shell, form a paste box or reservoir.

On the inside of each side of the shell are arranged grooves or channels C, to receive the ends of a shaft of a weighted roller, D, which is intended to tighten the belt and cause it to travel in the paste, said roller being kept parallel with the other rollers, and compelled when lifted to move in a vertical line.

E E′ are U-shaped bearings to receive the shafts of the belt-rollers F F′, and G is the feed-roller arranged at the extreme front end of the shell. This roller is composed of a tube the periphery of which is suitably roughened to make it take hold of and feed the belt H, which is caused to travel as clearly shown in the drawings at Fig. 1. This tubular roller is fastened in place by spring-wire rod I, passing through the same and the sides of the shell. The rod being bent slightly out of a straight line when forced into place produces sufficient frictional contact to cause the roller to rotate with it.

J is a thumb-roll, secured to the end of the rod I, by means of which the rod and roller are rotated at each movement of the machine to advance the label-strip to the knives, as will be hereinafter set forth.

L is a paste-scraper arranged in grooved bearings on the sides of the shell, so that it may be readily removed by springing the same. This scraper is arranged, as shown at Fig. 1, inside of the belt, and its edge is perfectly straight, in order that as the belt passes the same all paste will be removed from that side of the same.

M is another scraper, slightly above the one just described and on the other side of the belt, and its edge is serrated, so that while scraping off all surplus paste enough is permitted to pass to supply the requisite quantity to the label-strip, which travels from a reel, N, secured in the head of the machine. The leading end of the label-strip is placed on the belt, and the paste causes it to adhere thereto sufficiently to feed the same as the belt travels in the direction indicated by the arrow.

O is a metal knife secured to the front end of the bottom of the shell A, and *a* is a wire stripper arranged close to the feed-roller, so that the label-strip is stripped from the belt and bridged over to the cutting-edge of said knife. P is a movable knife pivoted at one end to one end of the stationary knife O by a bolt or screw, Q. R is a tubular socket secured to the upper surface of the knife P near the pivoted end, for the purpose directly explained. S is a rectangular wire frame pivotally attached at the rear ends, near the bottom of the shell, to ears *b b*, so that it may freely vibrate at such points. T is a tubular socket secured to one side of the frame S, and adapted to receive one end of a bent rod, U, the other end of which is located within the socket-bearing R on the movable knife heretofore referred to, from which arrangement it will be seen that as the frame S is moved upward it will cause the movable knife P to vibrate on its pivot and produce a shearing cut with the edge of the stationary knife O. V is a strut erected within sockets *c d* secured, respectively, to the shell and the end of the knife-pivot. The upper portion of this strut V is slightly sent or depressed to form a bearing for one end of a spring, W, the other end of which is secured to the movable knife between the pivot and free end, so that the action of the spring will lift the knife and accordingly depress the front end of the frame S. X is a wire loop, and Y a grasp.

It will be observed that the knife P is made broad and flat on the bottom, so that it will serve as a stamp for pressing the severed label upon the paper or other article to which it is to be pasted.

The belt is to be made of steam-packing or other suitable material which will be unaffected by moisture in the paste and at the same time retain its shape; and it will be readily seen that it can be removed for cleansing or renewal by springing out of its bearings the smooth-edged inside scraper, L, and removing the belt-rollers and tightener by simply lifting them from their bearings, the feed-roller being removed by the withdrawal of its shaft, as before described.

In using my improved machine, a supply of paste being furnished, and the label-strip being wound upon its reel, the free end is placed upon the belt after it has traveled sufficiently to have paste upon its surface, and by means of the thumb-feed the lead of the strip is projected over the edge of the stationary knife O, and at the same instant the machine is allowed to descend bodily upon the paper to be addressed. The contact of the front end of the vibrating frame S causes it to rise, and as it rises the movable knife P is vibrated on its pivot, and the label is cut off with its printed side against the under side of said knife, which now acts as a stamp to firmly press the pasted side of the label in contact with the paper to be addressed. As the machine is lifted and the frame S released from pressure the spring W, pulling upon the knife P, causes the frame to swing down below the bottom of the shell, ready for the next operation. During the upward bodily movement of the machine another label is fed over the knife O and the drop-cut operation repeated.

What I claim as new, and desire to secure by Letters Patent, is—

1. In combination with the shell and stationary knife, a vibrating knife and means for operating the same by the movement bodily of the shell to produce a drop-cut, as hereinbefore set forth.

2. In combination with the traveling belt H and shell A, the paste-distributer M and cleaner L, substantially as and for the purpose specified.

3. In combination with the shell A, belt H, feed-roller G, and rollers F F′, the weighted roller D, arranged to move vertically within the paste-box, substantially as described.

4. The feed-roller G, composed of a tube having its exterior surface roughened and secured in position by a spring-wire rod, I, substantially as set forth.

Witness my hand this 15th day of May, A. D. 1880.

ROBERT DICK.

In presence of—
WM. C. MCINTIRE,
F. W. SMITH, Jr.